(12) United States Patent
Schoenherr

(10) Patent No.: US 10,797,272 B2
(45) Date of Patent: Oct. 6, 2020

(54) ELECTRODE STACK RESTRAINT

(71) Applicant: Robert Bosch GmbH, Stuttgart (DE)

(72) Inventor: Robert Schoenherr, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 197 days.

(21) Appl. No.: 15/765,715

(22) PCT Filed: Sep. 28, 2016

(86) PCT No.: PCT/EP2016/073059
§ 371 (c)(1),
(2) Date: Apr. 3, 2018

(87) PCT Pub. No.: WO2017/063877
PCT Pub. Date: Apr. 20, 2017

(65) Prior Publication Data
US 2018/0287106 A1    Oct. 4, 2018

Related U.S. Application Data

(60) Provisional application No. 62/242,362, filed on Oct. 16, 2015.

(51) Int. Cl.
*H01M 2/04* (2006.01)
*H01M 2/02* (2006.01)
(Continued)

(52) U.S. Cl.
CPC ......... *H01M 2/0469* (2013.01); *H01M 2/024* (2013.01); *H01M 2/0478* (2013.01); *H01M 10/0463* (2013.01); *H01M 10/0468* (2013.01); *H01M 10/0585* (2013.01); *H01M 2/0217* (2013.01); *H01M 2220/20* (2013.01)

(58) Field of Classification Search
CPC ......... H01M 10/0468; H01M 10/0463; H01M 10/0585; H01M 2220/20; H01M 2/0217; H01M 2/024; H01M 2/0469; H01M 2/0478
See application file for complete search history.

(56) References Cited

U.S. PATENT DOCUMENTS

| | | | | |
|---|---|---|---|---|
| 4,778,479 A | * | 10/1988 | Romling | H01M 10/12 29/623.1 |
| 6,087,036 A | * | 7/2000 | Rouillard | H01M 2/202 429/120 |

(Continued)

FOREIGN PATENT DOCUMENTS

| | | |
|---|---|---|
| CN | 101478063 | 7/2009 |
| JP | H09-167627 | 6/1997 |

(Continued)

OTHER PUBLICATIONS

PCT International Search Report for PCT/EP2016/073059.

*Primary Examiner* — Carlos Barcena
(74) *Attorney, Agent, or Firm* — Kelly McGlashen; Maginot, Moore & Beck LLP

(57) ABSTRACT

A pouch cell includes a generally rectangular cell housing formed of a metal laminated film, an electrode assembly that is sealed within the cell housing, and an elastic restraint that surrounds a plate stack of the electrode assembly.

7 Claims, 4 Drawing Sheets

(51) Int. Cl.
*H01M 10/04* (2006.01)
*H01M 10/0585* (2010.01)

(56) References Cited

U.S. PATENT DOCUMENTS

| | | | |
|---|---|---|---|
| 6,383,234 B1 | 5/2002 | Noh | |
| 8,697,312 B2 * | 4/2014 | Shibata | H01M 8/248 |
| | | | 429/452 |
| 9,583,747 B2 * | 2/2017 | Baek | H01M 2/1077 |
| 2001/0008724 A1 * | 7/2001 | Ohms | H01M 2/1686 |
| | | | 429/66 |
| 2007/0052390 A1 * | 3/2007 | Kim | H01M 2/1016 |
| | | | 320/116 |
| 2007/0111089 A1 * | 5/2007 | Swan | H01M 2/266 |
| | | | 429/160 |
| 2010/0035128 A1 * | 2/2010 | Scordilis-Kelley | |
| | | | H01M 10/0468 |
| | | | 429/50 |
| 2011/0195299 A1 | 8/2011 | Hashimoto | |
| 2012/0171527 A1 * | 7/2012 | Hiroma | H01M 2/204 |
| | | | 429/61 |
| 2015/0132631 A1 * | 5/2015 | Lee | H01M 10/0436 |
| | | | 429/127 |
| 2015/0194649 A1 * | 7/2015 | Ledbetter | H01M 10/625 |
| | | | 429/72 |
| 2015/0288022 A1 | 10/2015 | Lee | |

FOREIGN PATENT DOCUMENTS

| | | |
|---|---|---|
| JP | 2004-047161 | 2/2004 |
| JP | 2014-026798 | 2/2014 |
| JP | 2014-093128 | 5/2014 |
| WO | 03/085754 | 10/2003 |

* cited by examiner

ELECTRODE STACK RESTRAINT

This application is a 35 U.S.C. § 371 National Stage Application of PCT/EP2016/073059, filed on Sep. 28, 2016, which claims the benefit of U.S. Provisional Patent Application No. 62/242,362, filed on Oct. 16, 2015, the disclosures of which are incorporated by reference herein in their entirety.

BACKGROUND

1. Field of the Invention

The present invention relates to a pouch-type battery cell that includes a stacked arrangement of electrode plates, and an elastic restraint that surrounds the electrode plates to provide structural integrity that facilitates manufacturing and mounting.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in two or three dimensional arrays and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. With respect to the cell housing, for example, the cylindrical cells and prismatic cells each have a rigid housing, usually made of metal or plastic, whereas the pouch cell is surrounded by a flexible outer envelope made of a laminated film material which seals off the actual battery space from the environment.

Some conventional pouch cells are limited in thickness by many factors. One of the factors is related to use of a metal laminated film to form the pouch. For example, the metal laminated film provides a somewhat flexible sealed container having minimal structural stability. As a result, some conventional pouch cells are not able to accommodate a high electrode plate count which would provide large electrode plate stack.

SUMMARY

A pouch cell includes an electrode assembly that is sealed within a pouch-type, metal laminated film cell housing along with an electrolyte to form a power generation and storage unit. The electrode assembly is a "stacked" electrode assembly that includes a series of stacked positive electrode plates alternating with negative electrode plates and separated by an intermediate separator plates. The pouch cell further includes an elastic restraint that surrounds the plate stack. The elastic restraint serves to maintain the plates of the stack in the desired alignment and in the stacked configuration, and to apply a compressive force in the stack direction (e.g., the direction normal to an active surface of the plates). Since the plate stack is restrained, the complexity of creating a tall electrode plate stack that includes a large number of plate pairs (e.g., greater than 100 plate pairs) is reduced. This can be compared to some conventional pouch cells in which stacked plates are not constrained and in which the electrode plate stacks include approximately 60 plate pairs and reach a maxim height of around 20 mm. In addition, since the restraint is elastic, the restraint accommodates growth of the plate stack in the stacking direction that occurs during cell charge and discharge while retaining the stack in the desired configuration.

In some embodiments, the elastic restraint includes a pair of non-conductive end caps that surround opposed ends of the plate stack and are connected together via one or more non-conductive elastic members. The restraint elastically constrains the electrode stack for easy handling, manipulation, and to increase structural integrity, while permitting the plate stack to grow as needed.

The restraint aids in manufacturing of the pouch cell and provides increased overall structural integrity to the pouch cell. The increased structural integrity in turn increases crash worthiness of the cell, facilitates mounting and tight packing within a battery pack or module, and eliminates the need for a separate external frame. The restraint constrains the cell electrode stack while still allowing for the expansion of the electrode stack during charge and discharge events. Further advantages of employing the restraint include the ability to accommodate a greater number of plate pairs than some conventional pouch cells, whereby the pouch cell height can be increased relative to that of some convention pouch cells. This results in increased energy density of the cell, module, and battery pack. In addition, the pouch cells that include the restraint require less structural material for the battery pack and battery module, which in turn reduces the mass and cost of the battery pack and battery module.

DETAILED DESCRIPTION

Figure 1:
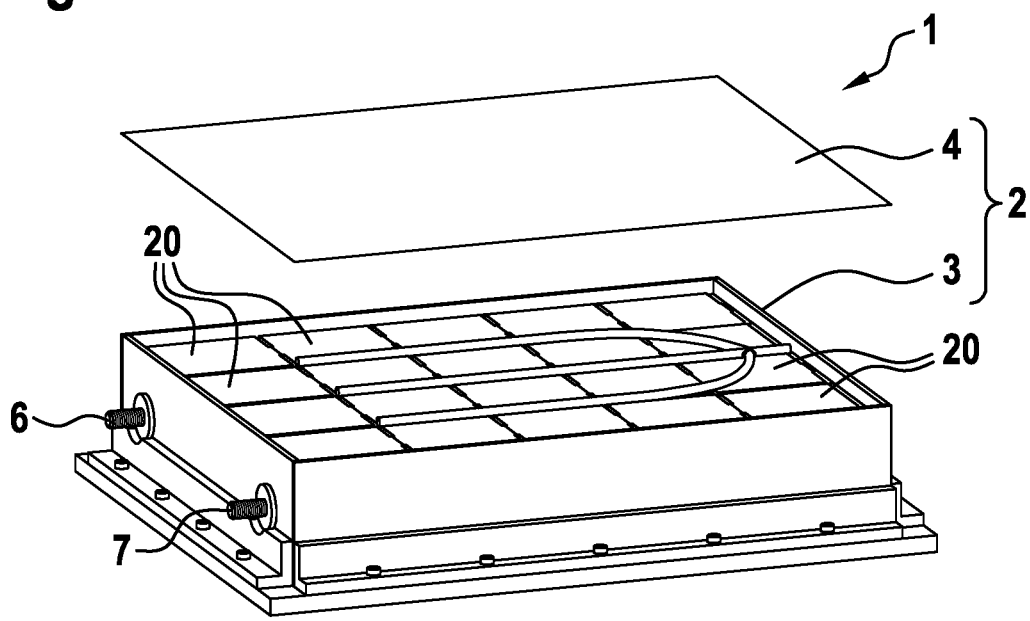
FIG. 1 an exploded perspective view of a battery pack including an array of pouch cells.
Figure 2:
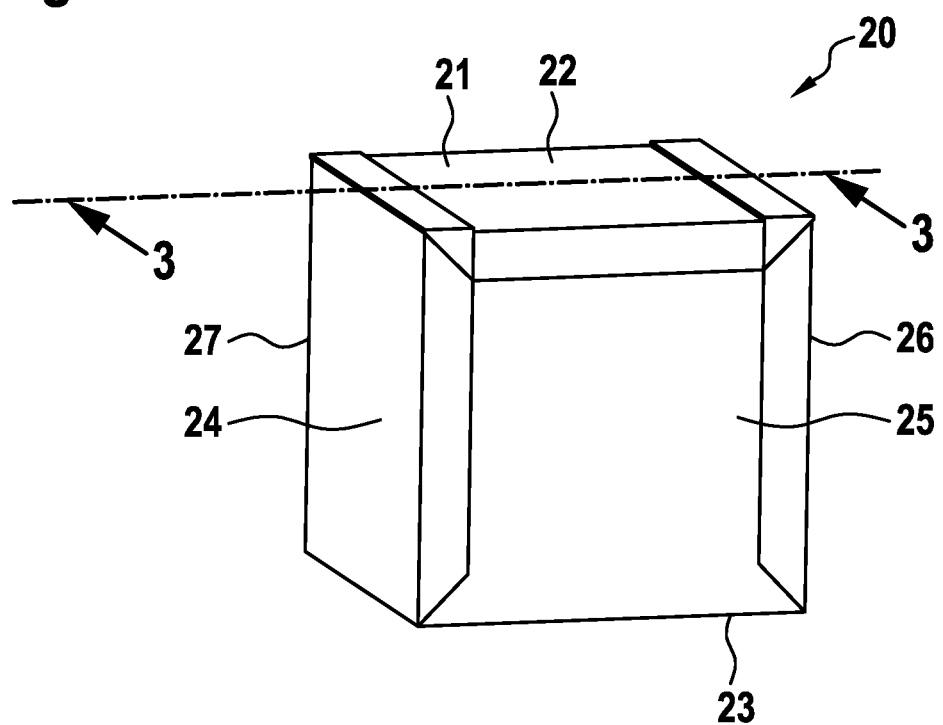
FIG. 2 is a perspective view of a pouch cell.
Figure 3:
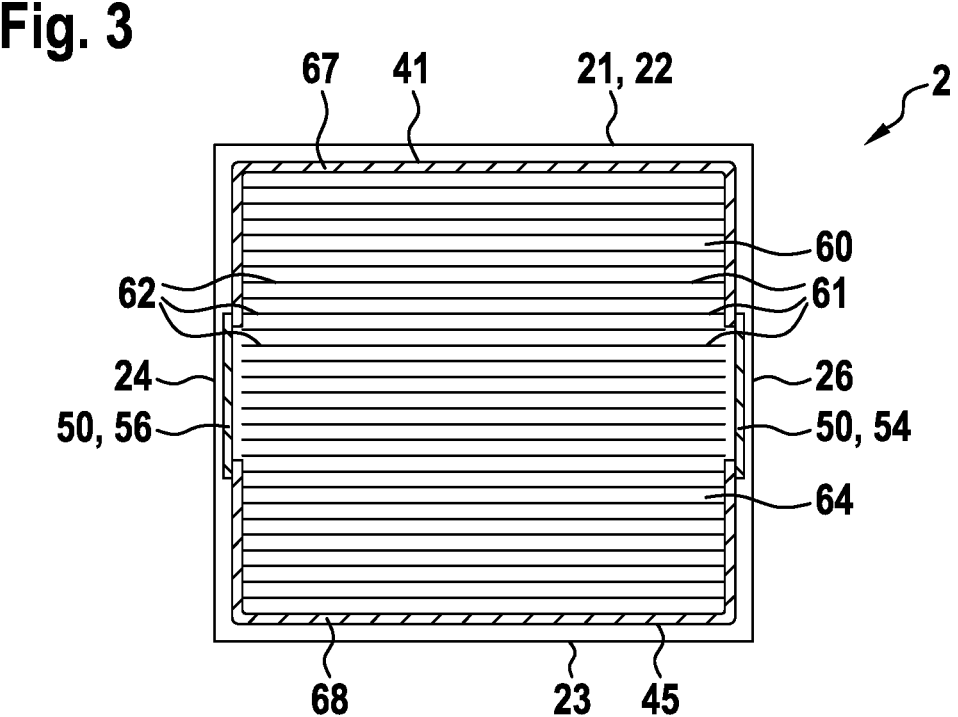
FIG. 3 is a schematic cross sectional view of the pouch cell of FIG. 2A as seen across line 3-3 of FIG. 2.

Referring to FIGS. 1-3, a battery pack 1 used to provide electrical power includes electrochemical cells 20 that are electrically interconnected and stored in an organized manner within a battery pack housing 2. The battery pack housing 2 includes a container portion 3 and a detachable lid 4. The cells 20 are lithium-ion pouch cells that include an electrode assembly 60 that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery pack housing 2, the cells 20 are electrically connected in series or in parallel.

Each cell 20 includes a pouch-type cell housing 21 formed of a metal laminated film. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The electrode assembly 60 disposed in the cell 20 includes a series of stacked positive electrode plates 61 alternating with negative electrode plates 62 and separated by intermediate separator plates (not shown). The series of stacked electrode and separator plates will be referred to herein as the "plate stack" 64, and a stack axis 66 of the plate stack 64 extends through a center of the plate stack 64 in a direction parallel to the stacking direction. The electrode plates 60, 61 are very thin (e.g., having a thickness on the order of about 0.095 to 0.145 mm) compared to the overall cell thickness (e.g. having a thickness on the order of tens or hundreds of mm) and thus are illustrated schematically in FIG. 3.

Figure 4:
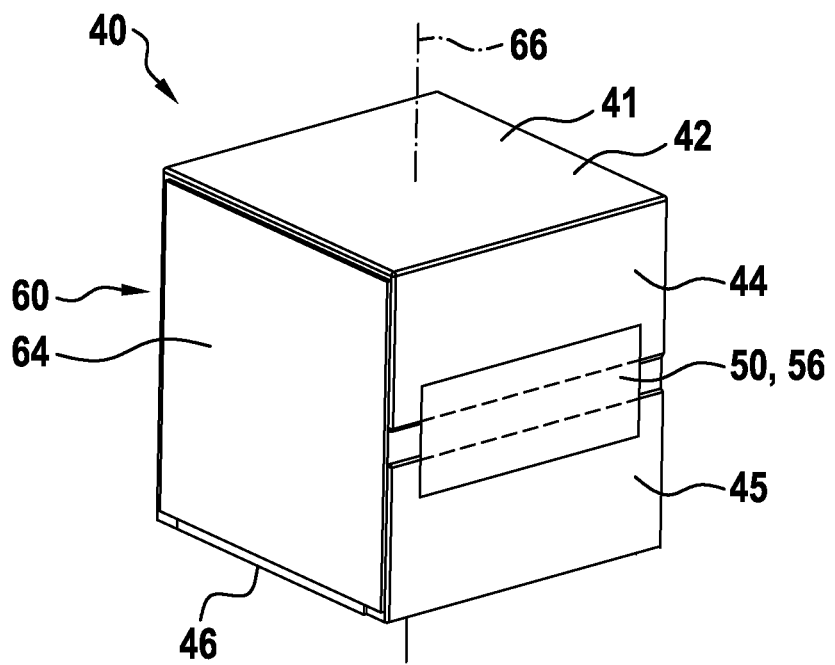
FIG. 4 is a perspective view of the electrode assembly assembled with the elastic restraint.
Figure 5:
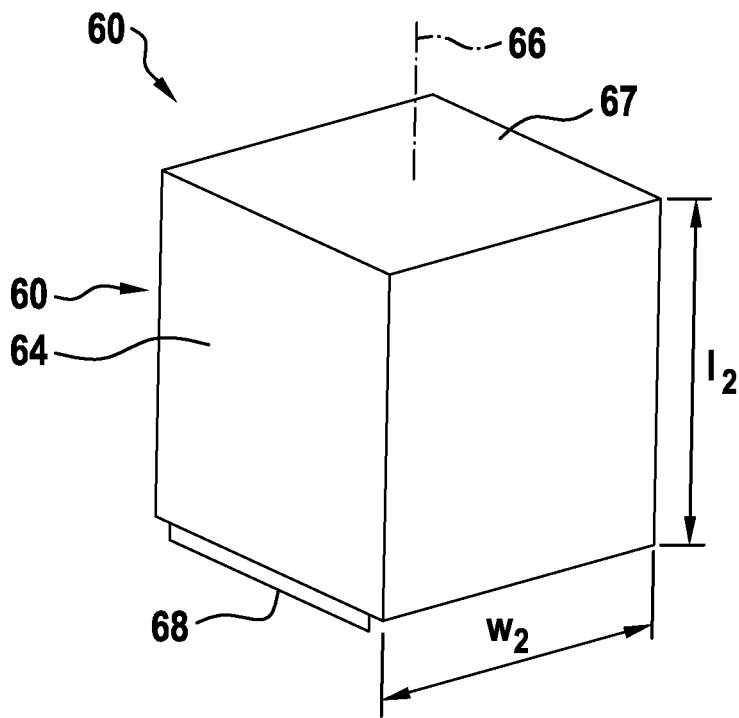
FIG. 5 is a perspective view of the electrode assembly of FIG. 4.
Figure 6:
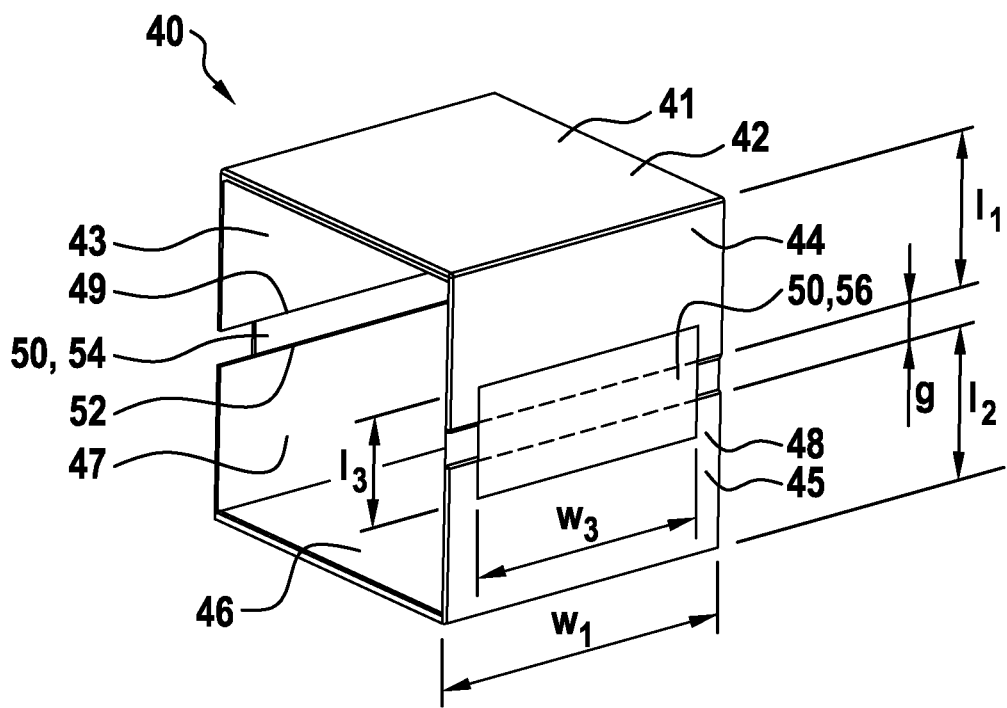
FIG. 6 is a perspective view of the elastic restraint of FIG. 4.

Referring to FIGS. 4-6, each cell 20 also includes an elastic restraint 40 used to maintain the plates 60, 61 of the plate stack 64 in the desired alignment and in the stacked configuration, and to apply a compressive force in a direction parallel to the stack axis 66. The restraint 40 has a first end cap 41, a second end cap 42, and an elastic member 50 disposed between and joining the first end cap 41 to the second end cap 42.

The first end cap 41 and the second end cap 42 each have a "U" shape. In particular, the first end cap 41 includes a first closed end 42 corresponding to a base of the "U", and parallel first legs 43, 44 that protrude from the first closed end 42. The first legs 42, 43 extend in a direction normal to the first closed end 42. An open end 49 of the first end cap 41 is defined between the free ends of the first legs 43, 44 and is opposed to the first closed end 42. Likewise, the second end cap 45 includes a second closed end 46 corresponding to a base of the "U", and parallel second legs 47, 48 that protrude from the second closed end 46. The second legs 47, 48 extend in a direction normal to the second closed end 46. An open end 52 of the second end cap 45 is defined between the free ends of the second legs 47, 48 and is opposed to the second closed end 46.

The first closed end 42 and the second closed end 46 have a shape and size that generally conforms to the shape and size of the electrode plates 61, 62 which they overlie. In the illustrated embodiment, the first closed end 42 and the second closed end 46 have a rectangular shape, for example a square shape to conform to the square shape of the electrode plates 61, 62. The first legs 43, 44 and the second legs 47, 48, which protrude from opposed edges of the respective closed ends 42, 46, have a width dimension w1 corresponding to a width w2 of the electrode plates 61, 62. The first legs 43, 44 and the second legs 47, 48 have a height h1 (e.g., a dimension in the direction perpendicular to the respective closed end 42, 46) that is less than half the height h2 (e.g., a dimension in the direction parallel to the stack axis 66) of the plate stack 64, whereby a gap g exists between the first legs 43, 44 and the second legs 47, 48.

The first end cap 41 and the second end cap 42 are formed of a material that is compatible with the electrolyte used within the cell housing 21, and have a high dielectric strength. For example, in the illustrated embodiment, the end caps 41, 42 are formed of a plastic such a Formex™.

The elastic member 50 is pair of elastic straps 54, 56 that are used to join the first end cap 41 to the second end cap 42. The elastic straps 54, 56 are rectangular in shape, and have a height h3 that is sufficient to bridge the gap g and also overlie portions the legs, and a width w3 that is at least 30 percent of the width w1 of the legs. For example, in the illustrated embodiment, the width w3 of the straps 54, 56 is about 80 percent of the width w1 of the legs.

The elastic straps 54, 56 are non-electrically conductive and formed of an elastic material that is compatible with the electrolyte used within the cell housing 21 such as ethylene propylene diene monomer (EPDM), which is a synthetic rubber membrane, or a fluoroelastomer. The elastic straps 54, 56 are joined to the respective legs 43, 44, 47, 48 using known methods, including for example, adhesives. In the illustrated example, a first elastic strap 54 is used to join one leg 43 of the first end cap 41 to one leg 47 of the second end cap 45, and a second elastic strap 56 is used to join the other leg 44 of the first end cap 41 to the other leg 48 of the second end cap 45.

In use, the restraint 40 is expanded in a direction perpendicular to the closed ends 42, 46 so that it can be assembled with the electrode assembly 60. The first end cap 41 is placed over the plate stack first end 67 so that the first closed end 42 faces and overlies the stack first end, while the second end cap 45 is placed over the plate stack second end 68 so that the second closed end 46 faces and overlies the stack second end 68. In this configuration, the first legs 43, 44 and the second legs 47, 48 extend in parallel to the stack axis 66 and overlie opposed sides of the plate stack 64, providing lateral stability to the plate stack 64. The first open end 49 of the first end cap 41 faces, and is spaced apart from, the second open end 52 of the second end cap 45. In addition, the restraint 40 surrounds a circumference of the plate stack 64, and the plate stack 64 is disposed between the first end cap 41 and the second end cap 42. Once the restraint 40 is assembled with the electrode assembly 60, the elastic properties of the straps 54, 57 draw the first end cap 41 toward the second end cap 45 along the stack axis 66, whereby a compression force is applied to the electrode stack 64 by the restraint in a direction parallel to the stack axis 66. The length dimensions of the legs 43, 44, 47, 48 and the gap are set such that the compression force is sufficient to maintain the plate stack in the desired stacked and aligned configuration while permitting growth of the plate stack, but is insufficient to damage the ion-exchange properties of the plates.

Figure 7:
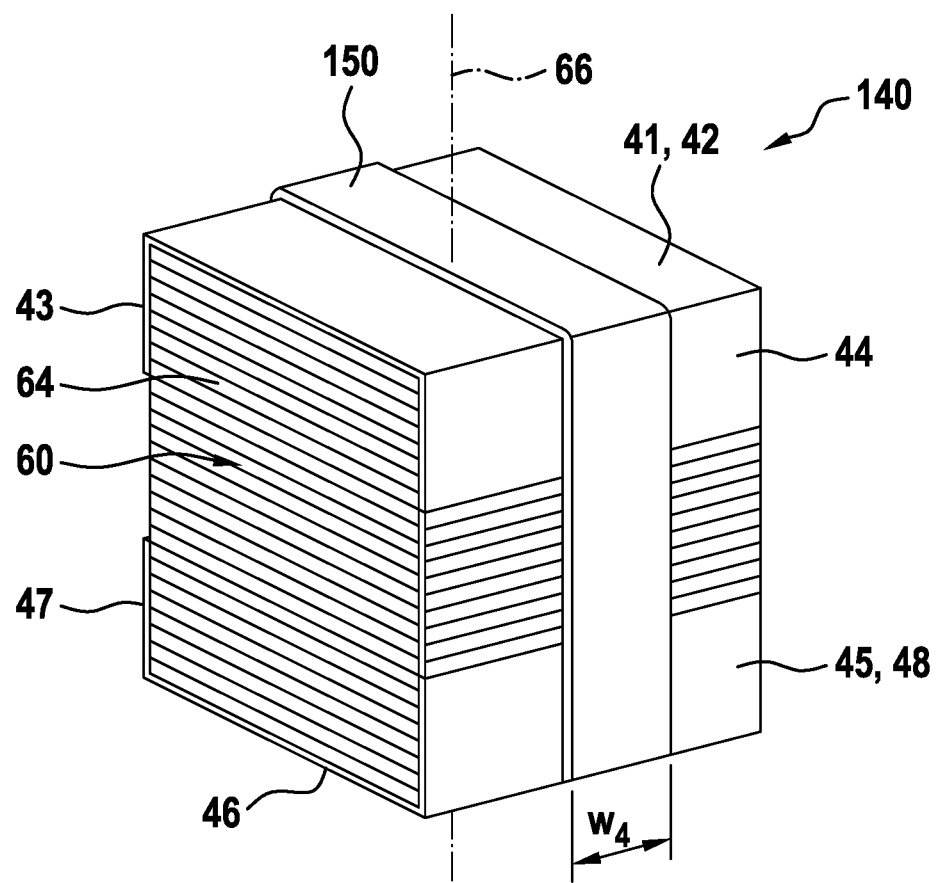
FIG. 7 is a perspective view of the electrode assembly assembled with an alternative elastic restraint.

Referring to FIG. 7, an alternative embodiment elastic restraint 140 may be used to maintain the plates 60, 61 of the plate stack 64 in the desired aligned and stacked configuration, and to apply a compressive force in a direction parallel to the stack axis 66. The restraint 140 has a first end cap 41, a second end cap 42, and an elastic member 150 disposed between and joining the first end cap 40 to the second end cap 42. The first and second end caps 41, 42 of the alternative embodiment restraint 140 are identical to those of the restraint 40 described above with respect to FIGS. 3-6, and thus common reference numbers are used to refer to common elements.

The elastic member 150 is an elastic annular band 152 that surrounds the first end cap 41, the second end cap 42 such that when in use, the plate stack 64 is disposed between the first end cap 41 and the second end cap 42 and the band 152 applies a compressive force to the plate stack 64 along a direction parallel to the stack axis 66. The band 152 may be formed of the same material as that of the straps 52, 54, and has a width w4 that is relatively wide. For example, the width w4 may be in a range of 25 to 100 percent of the width w1 of the legs. In some embodiments, a single, relatively wide band 150 is used to surround a circumference of the plate stack 64 (FIG. 7), while in other embodiments (not shown), multiple bands 152 having a relatively smaller width may be used to surround a circumference of the plate stack.

In the embodiments illustrated in FIGS. 3-7, the first end cap 41 and the second end cap 45 are U-shaped. However, the first and second end caps 41, 45 are not limited to having a U shape and may have other appropriate shapes. For example, in some embodiments, the first and second end caps 41, 45 may in the form of a plate having a peripheral shape that conforms to the peripheral shape of the plate stack 64 (i.e., having a rectangular peripheral shape).

In the embodiments illustrated in FIGS. 3-7, the first end cap 41 has the same size and shape as the second end cap 45. However, the restraint 40 is not limited to this configuration.

For example, in some embodiments, the first end cap 41 may be U-shaped and the second end cap 45 may be in the form of a rectangular plate.

Although the cell housing 21 is described herein as being a pouch cell housing formed of a metal laminated film, the cell housing 21 is not limited to this material or configuration. For example, the cell housing 21 may be formed of other materials and/or may be formed having a prismatic, cylindrical or other configuration.

Although the electrode assembly 60 is described herein as being a "stacked" electrode assembly that includes a series of stacked plates 61, 62, the electrode assembly 60 is not limited to this configuration. For example, in some embodiments, the electrode assembly 60 may include a rolled electrode assembly (e.g., a jelly roll assembly), a folded electrode assembly (i.e., a Z-fold assembly), or other electrode arrangement.

Selective illustrative embodiments of the battery cell and cell housing are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and battery cell housing been described above, the battery cell and/or battery cell housing is not limited to the working examples described above, but various design alterations may be carried out without departing from the devices as set forth in the claims.

What is claimed is:

1. A battery cell comprising
a cell housing,
an electrode plate stack disposed in the housing, the electrode plate stack including positive electrode plates, alternating with negative electrode plates and separated by intermediate separator plates, the electrode plate stack including a first end, a second end opposed to the first end and a stacking axis corresponding to a stacking direction of the positive electrode plates and the negative electrode plates, and
an elastic restraint that surrounds the electrode plate stack and applies a compressive force to the electrode plate stack in a direction parallel to the stack axis, the electrode plate stack and the elastic restraint providing an assembly that is disposed inside the cell housing, the elastic restraint including:
a first end cap that overlies the first end of the electrode plate stack;
a second end cap that overlies the second end of the electrode plate stack; and
an elastic member that joins the first end cap to the second end cap,
wherein the first end cap has a "U" shape defined by a first closed end that faces the first end of the electrode stack and parallel first legs that protrude from the first closed end toward the second end of the electrode stack in a direction parallel to the stacking axis, and the first end cap includes a first open end opposed to the first closed end, and
the second end cap has a "U" shape defined by a second closed end that faces the second end of the electrode stack and parallel second legs that protrude from the second closed end toward the first end of the electrode stack in a direction parallel to the stacking axis, and the second end cap includes a second open end opposed to the second closed end.

2. The battery cell of claim 1, wherein the first legs are spaced apart from the second legs in a direction parallel to the stacking axis.

3. The battery cell of claim 1, wherein the elastic member includes a first elastic strap and a second elastic strap, the first elastic strap joins a first one of the first legs to a first one of the second legs, and the second elastic strap joins a second one of the first legs to a second one of the second legs.

4. The battery cell of claim 1, wherein the elastic member is an elastic annular band that surrounds the first end cap and the second end cap.

5. A method of forming a battery cell, the method including
providing an electrode plate stack, the electrode plate stack including positive electrode plates alternating with negative electrode plates and separated by intermediate separator plates, the electrode plate stack including a first end, a second end opposed to the first end and a stacking axis corresponding to a stacking direction of the plate,
providing a restraint device that includes
a first end cap,
a second end cap, and
an elastic member that joins the first end cap to the second end cap,
assembling the restraint device with the electrode stack to form a stack assembly in which the first end cap overlies the first end of the electrode plate stack, the second end cap overlies the second end of the electrode plate stack, and the elastic member joins the first end cap to the second end cap such that the restraint device applies a compressive force to the electrode plate stack in a direction parallel to the stacking axis,
wherein the first end cap has a "U" shape defined by a first closed end that faces the first end of the electrode stack and parallel first legs that protrude from the first closed end toward the second end of the electrode stack in a direction parallel to the stacking axis, and the first end cap includes a first open end opposed to the first closed end, and
the second end cap has a "U" shape defined by a second closed end that faces the second end of the electrode stack and parallel second legs that protrude from the second closed end toward the first end of the electrode stack in a direction parallel to the stacking axis, and the second end cap includes a second open end opposed to the second closed end.

6. The method of claim 5, including providing a battery cell housing, and inserting the stack assembly in the battery cell housing.

7. The method of claim 6, wherein the battery cell housing is a pouch cell housing.

* * * * *